US012682052B2

(12) United States Patent
    Tajik et al.

(10) Patent No.: US 12,682,052 B2
(45) Date of Patent: Jul. 14, 2026

(54) ELECTRONIC TAMPERING DETECTION

(71) Applicant: Worcester Polytechnic Institute, Worcester, MA (US)

(72) Inventors: Shahin Tajik, Northborough, MA (US); Patrick Schaumont, Worcester, MA (US); Tahoura Mosavirik, Worcester, MA (US)

(73) Assignee: Worcester Polytechnic Institute, Worcester, MA (US)

( * ) Notice: Subject to any disclaimer, the term of this patent is extended or adjusted under 35 U.S.C. 154(b) by 213 days.

(21) Appl. No.: 18/209,785

(22) Filed: Jun. 14, 2023

(65) Prior Publication Data

US 2023/0401342 A1     Dec. 14, 2023

Related U.S. Application Data

(60) Provisional application No. 63/351,913, filed on Jun. 14, 2022.

(51) Int. Cl.
    *G06F 21/55* (2013.01)
    *G06F 21/57* (2013.01)
    *G06F 21/76* (2013.01)

(52) U.S. Cl.
    CPC ............ *G06F 21/554* (2013.01); *G06F 21/57* (2013.01); *G06F 21/76* (2013.01)

(58) Field of Classification Search
    CPC ................... G06F 21/554; G06F 21/57; G06F 21/75–755; G06F 21/76; G06F 21/86–87; G06F 21/88
    See application file for complete search history.

(56) References Cited

U.S. PATENT DOCUMENTS

| | | | |
|---|---|---|---|
| 8,850,608 B2 | 9/2014 | Tehranipoor et al. | |
| 11,018,668 B2 | 5/2021 | Zhao et al. | |
| 2013/0030741 A1 | 1/2013 | Iorga | |
| 2013/0044003 A1 | 2/2013 | Eguro et al. | |
| 2021/0150071 A1* | 5/2021 | Vincent ................. | G06F 21/755 |
| 2022/0035927 A1* | 2/2022 | Lysecky ................ | G06F 21/566 |
| 2023/0063688 A1* | 3/2023 | Plaquin .................. | G01R 29/14 |

(Continued)

FOREIGN PATENT DOCUMENTS

EP          3291127 B1     3/2019

OTHER PUBLICATIONS

Huifeng Zhu, et al., "PDNPulse: Sensing PCB Anomaly with the Intrinsic Power Delivery Network", arXiv:2204.02482v1. pp. 1-17, Apr. 2022 [Retrieved on Sep. 20, 2023]. Retrieved from: <URL: https://arxiv.org/pdf/2204.02482v1.pdf.

(Continued)

*Primary Examiner* — Kevin Bechtel
(74) *Attorney, Agent, or Firm* — Armis IP Law, LLC

(57)          ABSTRACT

A method for detecting physical attacks on a computing device includes embedding a sensor or FPGA (Field Programmable Gate Array) on a circuit board for gathering a frequency response of a power distribution network providing power to the circuit board. During operation of the circuit board, the sensor identifies and gathers a frequency response suspected of resulting from a tamper effort, and compares the identified frequency response to a frequency response of tempering events. Based on the comparison, a determination of tampering is made.

14 Claims, 3 Drawing Sheets

10

(56) References Cited

U.S. PATENT DOCUMENTS

2024/0403495 A1* 12/2024 Newell ................. G06F 17/141

OTHER PUBLICATIONS

International Search Report, PCT/US2023/025287, Oct. 5, 2023, pp. 1-4.

Tahoura Mosavirik et al., "ImpedanceVerif: On-Chip Impedance Sensing for System-Level Tampering Detection", IACR Transactions on Cryptographic Hardware and Embedded Systems, vol. 2023, No. 1, pp. 301-325, Nov. 29, 2022 [Retrieved on Sep. 20, 2023]. Retrieved from: URL: https://doi.org/1046586/tches.v2023.i1.30-325>.

Xuan Zhang et al., 'PDN-Pulse: Ubiquitous and Inherent Anomaly Detection with Cross-Layer Interaction of Power Delivery Network', Air Force Research Laboratory Information Directorate, Final Technical Report, AFRL-RI-RS-TR-2021-145, pp. 1-18, Aug. 1, 2021 [Retrieved on Sep. 20, 2023]. Retrieved from: <URL: https://apps.dtic.mil/sti/citations/AD1146566>pp. 1, 3-4, 14; and figures 1-2.

* cited by examiner

ELECTRONIC TAMPERING DETECTION

RELATED APPLICATIONS

This patent application claims the benefit under 35 U.S.C. § 119(e) of U.S. Provisional Patent App. No. 63/351,913, filed Jun. 14, 2022, entitled "ELECTRONIC TAMPERING DETECTION" incorporated herein by reference in entirety.

BACKGROUND

Physical attacks and intrusions can compromise the security of cryptographic devices. Depending on the attack's requirements, adversaries might need to (i) place probes in the proximity of the integrated circuits (ICs) package, (ii) create physical connections between their probes/wires and the system's PCB, or (iii) physically tamper with the PCB's components, chip package, or substitute the entire PCB to prepare the device for the attack. While tamper-proof enclosures prevent and detect physical access to the system, their high manufacturing cost and incompatibility with legacy systems make them unattractive for many low-cost scenarios.

SUMMARY

A chip or on-board element employs techniques based on power integrity analysis for performing impedance characterization of the power distribution network (PDN) of an electronic system using on-chip circuit-based network analyzers to detect various classes of tamper events. Embedded network analyzers, can be deployed on FPGAs (Field Programmable Gate Arrays) without any modifications to the tested/protected system to extract the frequency response of the PDN. The analysis of these frequency responses reveals different classes of tamper events from board to chip level. Validation is performed via an embedded network analyzer on FPGAs of a family of commercial development kits and perform extensive measurements for various classes of PCB and IC package tampering required for conducting different side-channel or fault attacks.

Configurations herein are based, in part, on the observation that security breaches of information systems may occur via physical alteration or intrusion onto the circuit board, chips or components. Strong cryptography is required to maintain the secrecy and integrity of processed data in the embedded systems. Unfortunately, conventional approaches to device and network security suffer from the shortcoming that, even in the existence of such cryptographic primitives, attackers who obtain physical access to these devices can perform physical attacks to break the security of the entire system. Mounting physical attacks (e.g., Side-Channel Analysis (SCA) and Fault-Injection (FI)) usually requires adversaries to tamper with the system and prepare it for such attacks. Depending on the attack requirements, tampering at different abstraction levels of the system, from the printed circuit board (PCB) to integrated circuits (ICs), is desired by the attacker. Configurations herein substantially overcome the shortcomings of conventional methods by presenting an approach implemented as an anti-tamper sensor that can be implemented on the PCB to continuously monitor and verify the integrity of electronic systems in an untrusted field.

BRIEF DESCRIPTION OF THE DRAWINGS

The foregoing and other objects, features and advantages of the invention will be apparent from the following description of particular embodiments of the invention, as illustrated in the accompanying drawings in which like reference characters refer to the same parts throughout the different views. The drawings are not necessarily to scale, emphasis instead being placed upon illustrating the principles of the invention.

DETAILED DESCRIPTION

Figure 1:
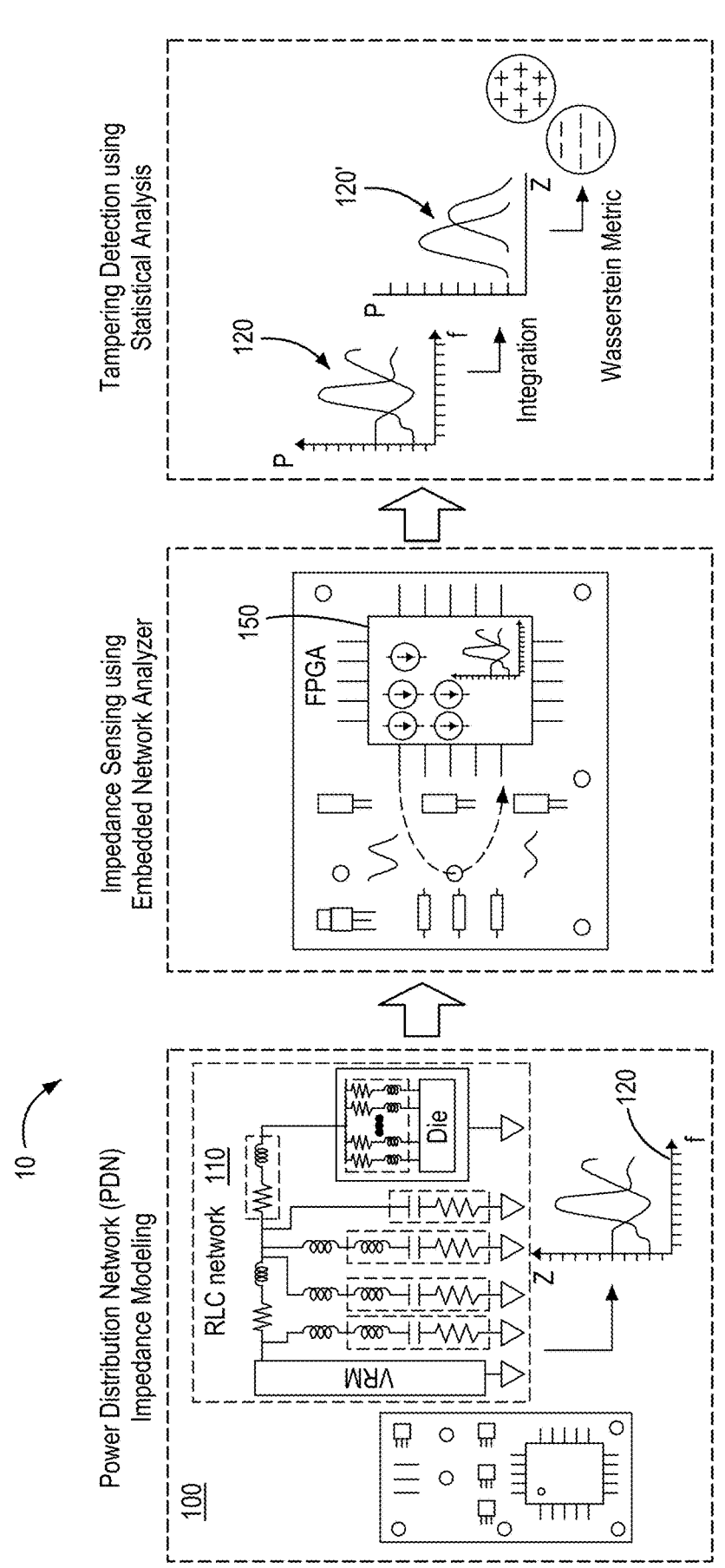
FIG. 1 is a schematic diagram for modeling the PDN response via an RLC equivalent circuit.

In circuit boards implementing processor based circuits such as embedded systems, strong cryptography is required to maintain the secrecy and integrity of processed data in. However, even in the existence of such cryptographic primitives, attackers who obtain physical access to these devices can perform physical attacks to break the security of the entire system. Mounting physical attacks (e.g., Side-Channel Analysis (SCA) and Fault-Injection (FI)) usually requires adversaries to tamper with the system and prepare it for such attacks. Depending on the attack requirements, tampering at different abstraction levels of the system, from the printed circuit board (PCB) to integrated circuits (ICs), is a typical strategy of the attacker. For example, in the case of power analysis attacks, an adversary might need to solder or replace a shunt resistor on the PCB's power rails or remove decoupling capacitors from the PCB to amplify leakage through power consumption. Another example includes polishing or removing the integrated circuit (IC) package to carry out semi- or fully-invasive attacks. In extreme cases, the attacker might even desolder the chip from its original PCB and mount it on custom boards or sockets optimized for attacks. However, in most non-invasive attacks, an adversary might only create connections between invasive probes and the PCB or place electromagnetic probes in a contactless fashion close to the IC package without any physical modifications to the system.

Conventional approaches to anti-tamper solutions tend to be based on physical barriers or containment around the entire system utilizing hardware security modules (HSMs). These envelopes detect changes in the physical characteristics of the environment, such as the enclosure's capacitance or the envelope's internal electromagnetic field.

While such secure enclosures shield the system against several classes of tampering and modifications, they are very costly and need a highly customized design, making them unusable for legacy systems. Therefore, the disclosed solution seeks anti-tamper schemes, which on the one hand, cover different abstraction levels of the system from PCB to chip level, and on the other hand, require minimal changes to the conventional electronic boards. Ideally, a security-critical chip holding secret keys and other assets should be able to physically sense its environment to detect any unauthorized changes in the system and react accordingly. There have been conventional attempts to include such self-contained sensors into system security ICs to detect physical anomalies, including PCB-level Trojans, counterfeit boards or removal of components. On digital ICs (Integrated Circuits) and field-programmable gate arrays (FPGAs), these sensors take the form of timing circuits such as on-chip and PCB trace-based ring-oscillators. If operation proceeds as predicted, any PCB anomalies will then affect the sensitive timing behavior of these sensors.

However, such conventional passive sensing methods have led to low-precision measurements and noisy behavior. Therefore, advanced signal processing and machine learning methods are needed to obtain acceptable classification accuracy. On the other hand, active sensing methods, such as time-domain reflectometry (TDR), have shown a high precision in detecting malicious implants on the I/O signal traces of PCB. However, they need custom analog circuits inside the chips. Moreover, all these solutions only demonstrate the detection of specific modifications to the system (e.g., removal/insertion of a component to an I/O signal trace). It remains open how these solutions apply to multiple classes of tampering. Accordingly, configurations herein present an approach for an on-chip circuit-based sensor that is capable of monitoring the physical integrity of its environment beyond its die, from its package to PCB, in a unified manner.

Configurations herein address this problem of why existing on-chip sensors have limited applicability and poor performance when sensing tampering of the environment beyond the chip itself. Based on novel insights in power integrity analysis and its application to physical integrity, disclosed below is a self-contained tamper-evident sensor device suitable for on chip/on board mounting. The sensor characterizes the impedance of a power distribution network (PDN) of the circuit, board and/or system, and can verify the physical integrity of the system from board to chip level. As any tampering attempt on the PCB will lead to changes in the equivalent impedance of the PDN, the continuous physical scanning of PDN will reveal whether the PCB's integrity has been violated. In this regard, configurations herein demonstrate how the functionality of network analyzers, which are the traditional tools to perform such impedance characterizations, can be emulated on FPGAs without any extra component or modification to the system. We demonstrate that electrically stressing the PDN of the system with various frequencies and simultaneously measuring voltage drop for impedance estimation is beneficial for detecting various tamper events. We further show that the impact of different classes of tampering on the magnitude of PDN impedance is higher at certain frequency bands. Based on demonstrations on a commercial FPGA board and deploying Wasserstein Distance as a metric, the disclosed approach shows that such a wideband impedance characterization could surprisingly reveal very sophisticated tampering and modifications to the system, namely, (i) the addition/removal of PCB components, (ii) the connection of a probe/wires to the PCB, the presence of an EM probe close to the IC package, (iv) and modifications to the IC package.

Configurations herein utilize impedance characteristics measurable from a PCB circuit in the form of the PDN. Getting power around a processor based printed circuit board (PCB) is complicated and expensive. Electrical power generally starts at a power supply and is transferred by wires to a printed circuit board. Attached to that board are one or more ICs. Traces on the PCB connect from the pads where the power supply wires are connected to the pad where power will be transferred to the chip. Those PCB traces may also involve vias that go through the PCB. To go from the chip pad into the chip will involve some type of pin or bump and that has to be connected to the semiconductor surface—often involving a wire or other metal conductor and solder. Then a series of metal layer traces and vias, and potentially traces within the silicon, connect the transistors to the supply. Along that path, a set of resistances, capacitance and inductances are inherited such that what appears at the transistor is not a perfect replication of what came out of the power supply.

According to the disclosed approach, in an electronic system on a circuit board having a processor and traces for distribution of power to circuit components on the board, the method of detecting tampering with the electronic system includes identifying an impedance model of a power distribution network (PDN) on a circuit board by representing the PDN as an RLC (Resistance, Inductance. Capacitance) circuit. An RLC circuit is an electrical circuit consisting of a resistor (R), an inductor (L), and a capacitor (C), connected in series or in parallel. One or more impedance models are stored as an indicator of normal operation of an electronic system on the circuit board, as a baseline of untampered operation. Through monitoring of the impedance, the device determines a change to the impedance model based on a successive gathering of a deviant impedance model from the circuit board, and concludes that a tempering event has occurred to the circuit board based on a comparison of the impedance model and the deviant impedance model. In other words, a sampling of an impedance response during normal operation is saved, and a successive change in the impedance detected to indicate a possible tampering event.

FIG. 1 is a schematic diagram for modeling the PDN response via an RLC equivalent circuit. Referring to FIG. 1, a framework 10 for operation of an on-board or on-chip device includes forming an RLC circuit 110 indicative of a PDN exhibited by an electronic system under test 100 to generate an impedance model 120. Next, the tamper detection device 150, such as a FPGA encoded with instructions as defined herein, characterizes the impedance of the RLC circuit 110 using an embedded network analyzer on the FPGA. Tampering detection results from statistical analysis of the normal, or "golden" model 120 with a successive model 120' for detecting deviations caused by tamper events. In an example configuration, a Wasserstein metric may be employed for computing the deviations from "normal" operation.

The tamper detection device generates an expected impedance signature from the impedance model 120 based on a response of the PDN, and determines the presence of the tampering event by computing a successive signature from the successive model 120' and identifying a difference between the successive signature and the expected impedance signature.

Figure 2:
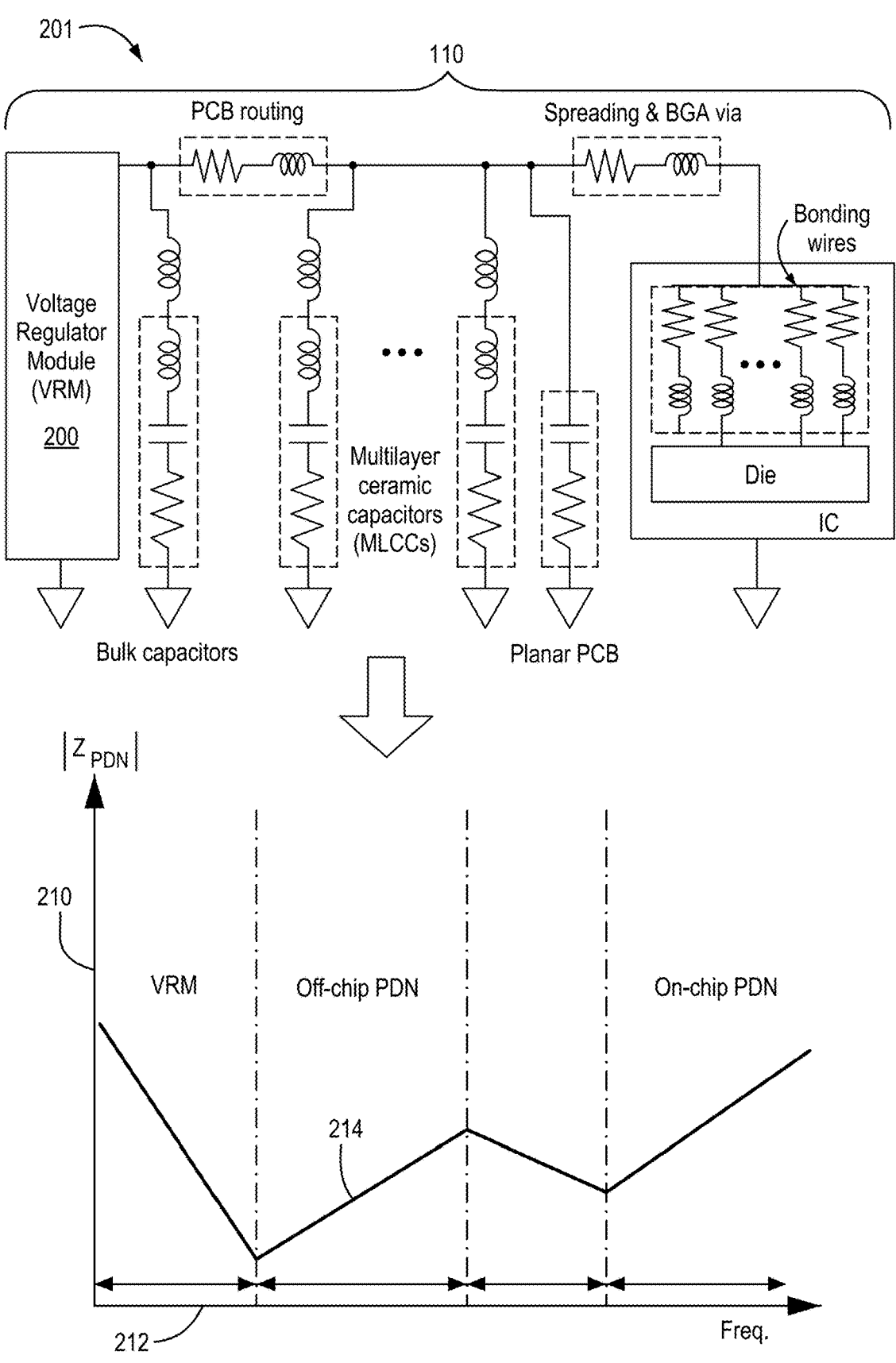
FIG. 2 shows an equivalent RLC circuit response as in FIG. 1.

The models 120, 120' result from characterization of the PDN of the system under test. A PDN handles the power delivery of the system from the external power regulator down to the transistors on the chip. FIG. 2 shows an equivalent RLC circuit response as in FIG. 1. Referring to FIGS. 1 and 2, FIG. 2 demonstrates a PDN model for a typical PCB. The equivalent circuit of a PDN 201 is an RLC network 110. The PDN connects a VRM 200 to every power-sinking component on the PCB, and every component has specific power and voltage requirements. The PDN covers off-chip components such as bulk capacitors, PCB routing, multilayered ceramic capacitors (MLCCs), spreading, and vias. The PDN also covers on-chip components such as IC packaging, bonding wires, on-chip power grid, etc. The contribution of each component to the PDN's impedance 210 is distinct at different frequencies 212, graphed as a frequency response 214. While at lower frequencies the equivalent impedance of the PDN is dominated by the voltage regulator's characteristics, at higher frequencies, the off-chip and on-chip components contribute most to the impedance.

A primary reason for such an impedance behavior is the existing parasitic inductance on each capacitor. An ideal capacitor behaves as a short-circuit at high frequencies. However, the parasitic inductance causes the capacitor to resonate at a particular frequency depending on its capacitance and inductance values. Smaller capacitors have smaller parasitic inductance due to their smaller physical dimensions, and therefore, they resonate at higher frequencies. In this case, the capacitor's impedance for frequencies higher than its resonance frequency increases, and thus, at very high frequencies, the capacitor behaves like an open circuit. As a result, by moving to higher frequencies, each set of capacitors, from the large components to the smaller components, become open circuits and their effect on the PDN impedance diminishes.

Accordingly, the tamper detection device 150 generates, from the PDN 201, an equivalent RLC circuit, and identifies the impedance model from the equivalent RLC circuit, shown as RLC network 110. The device 150 identifies the impedance model 120 based on current flow characteristics measured at a range of frequencies exhibited by the PDN. In operation, the device 150 is deployed as a logic element or component such as a FPGA on the circuit board of an electronic system under test, such that the logic element includes instructions for identifying the impedance model 120, 120'. Tampering is detected based on received inputs to the equivalent RLC circuit via electrical communication of the logic element with the PDN of the system under test.

Z (impedance) and S (scattering) parameters characterize the PDN impedance over different frequency bands. These parameters are usually employed in RF and microwave engineering and in power/signal integrity analysis of electronic systems to describe the electrical properties of linear RLC electrical networks. S- and Z-parameters are complex numbers (including voltage amplitude and phase of traveling waves) and are frequency-dependent. The number and organization of the parameters depend on the available electrical ports on the RLC circuit. S-parameters directly represent the signal's attenuation and reflection/transmission at each network port. On the other hand, Z-parameters can be used to derive the observed impedance at each port of the network. S-parameters and Z-parameters represent comparable data, but it may be more convenient to measure one or the other depending on the measuring conditions. Network analyzers can stimulate the PDN of the system by injecting waves with different frequencies into the network and by measuring the amount of reflection and transmission at each frequency. The resulting measurements reveal the frequency response 214 of the system. Configurations distinguish scalar network analyzers (SNA) and vector network analyzers (VNAs). While SNA can only measure the magnitude of the signal, VNAs can measure both the amplitude and the phase of the traveling wave. VNAs are useful for detecting counterfeit and tampering at the PCB level using both scattering and impedance parameters.

Conventional approaches to on-chip circuit-based sensors have been shown to indirectly sense the changes in the impedance of the PDN due to different anomalies. Virtually all these conventional circuit-based sensors are based on various ring-oscillators (ROs) architectures due to their sensitivity, simplicity, and compatibility with digital circuits. The expected outcome has been that modifications in part of the system's board or package lead to changes in the frequency behavior of these ROs, and consequently, the attacks would be detected. For instance, on-chip RO-based sensors have been proposed to detect counterfeit PCBs and hardware Trojan implants on PCBs by monitoring the PDN or traces of the PCB. While in the former case, a network of ROs is realized on the chip to sense the PDN modifications, in the latter schemes, either extended ROs between chips and off-chip PCB traces or I/O bank-based ROs are deployed to monitor the physical integrity of connected traces to the chip. Such on-chip RO-based sensors have also been proposed to measure the impact of die-package stress interaction on transistor performance. In more ambitious attempts, it has even been attempted to detect the effect of non-invasive attacks on the system. A prime example is the integration of a custom LC oscillator into the front side of the IC package to detect the approach of an EM probe. Another example is the measurement of a voltage drop due to inclusion of a shunt resistor into the PCB using an on-chip RO.

By taking a careful look at the outcomes of these sensors, it becomes evident that the changes in the behavior of RO sensors in some tampering scenarios are not distinguishable from changes due to the noise (i.e., thermal noise, process variation, etc.). Moreover, they have been designed only for specific system modifications, and therefore, do not cover a wide range of tamperings. The main reason behind the shortcomings of such RO solutions is a passive sensing mechanism. As described above, each component on an electronic board contributes to the overall PDN impedance in different frequency bands. To measure the PDN impedance at different frequencies, each discrete frequency needs to be measured by actively stimulating the system and by measuring each response.

If the system under test is stimulated using always-on stressor circuits or not stressed at all, the RO sensors can only measure the DC characteristics of the PDN, namely the resistance. Even if we consider the generated pulses by switching transistors in an RO sensor as stressors, the switching frequency, and its harmonics are constant, and thus, the system is stimulated at only a few frequency points. Some PCB modifications might lead to resistance variations, and therefore, such passive sensors can detect them. However, many tamperings lead to changes in the capacitance and inductance at specific frequencies, which are not measurable using passive sensors.

Accordingly, configurations claimed herein generate the impedance model 120 by stimulating the PDN through drawing electrical current with different frequencies, and measuring voltage drops resulting from the current draw at the different frequencies. Commencing with identifying the impedance model by gathering genuine samples of impedance profiles from the PDN in a trusted environment, a true, golden model of the untampered system under test is attained. Such genuine samples are gathered in an enrollment phase for successive comparison with impedance models gathered from a suspect environment following deployment of the system under test.

In a typical threat model, it can be assumed that the victim's electronic board is operated in an untrusted field and the attacker has physical access to it. The goal is to detect the attacker's tampering attempt on the system before an SCA or FI attack can be mounted. The attacker is interested in the secrets and assets stored on a security-critical IC (e.g., a root-of-trust, cryptographic chip, etc.) soldered on a PCB. We assume that this security-critical IC contains an embedded network analyzer circuit for impedance characterization of the PDN. We assume that the adversary can physically tamper with all components on the core and I/O PDNs of the board connected to the victim chip, including adding/removing/replacing other components. Moreover, the adversary can make physical connections with the core and I/O PDNs of the system to run measurements or communicate with the victim chip. The intruder can also can tamper with the IC package and pins and even place probes in the proximity of the package. However, it should be expected that they cannot tamper with the running impedance characterization IP during the design phase (e.g., using hardware Trojan insertion) or operation phase (e.g., using remote fault injection attacks). Furthermore, the proposed sensing countermeasure applies to powered-on systems.

It may be further assumed that the PDN's impedance profiles of genuine samples have been collected in an enrollment phase in a trusted environment and stored on the victim chip, which performs the impedance characterization. Later in the hostile environment, the impedance characterization can be performed before boot or during runtime to verify the system's integrity for possible tampering attempts. Upon detection of a discrepancy between the measured impedance profile and the golden, trusted impedance profile, an anti-tamper response such as key zeroization may be executed.

Figure 3:
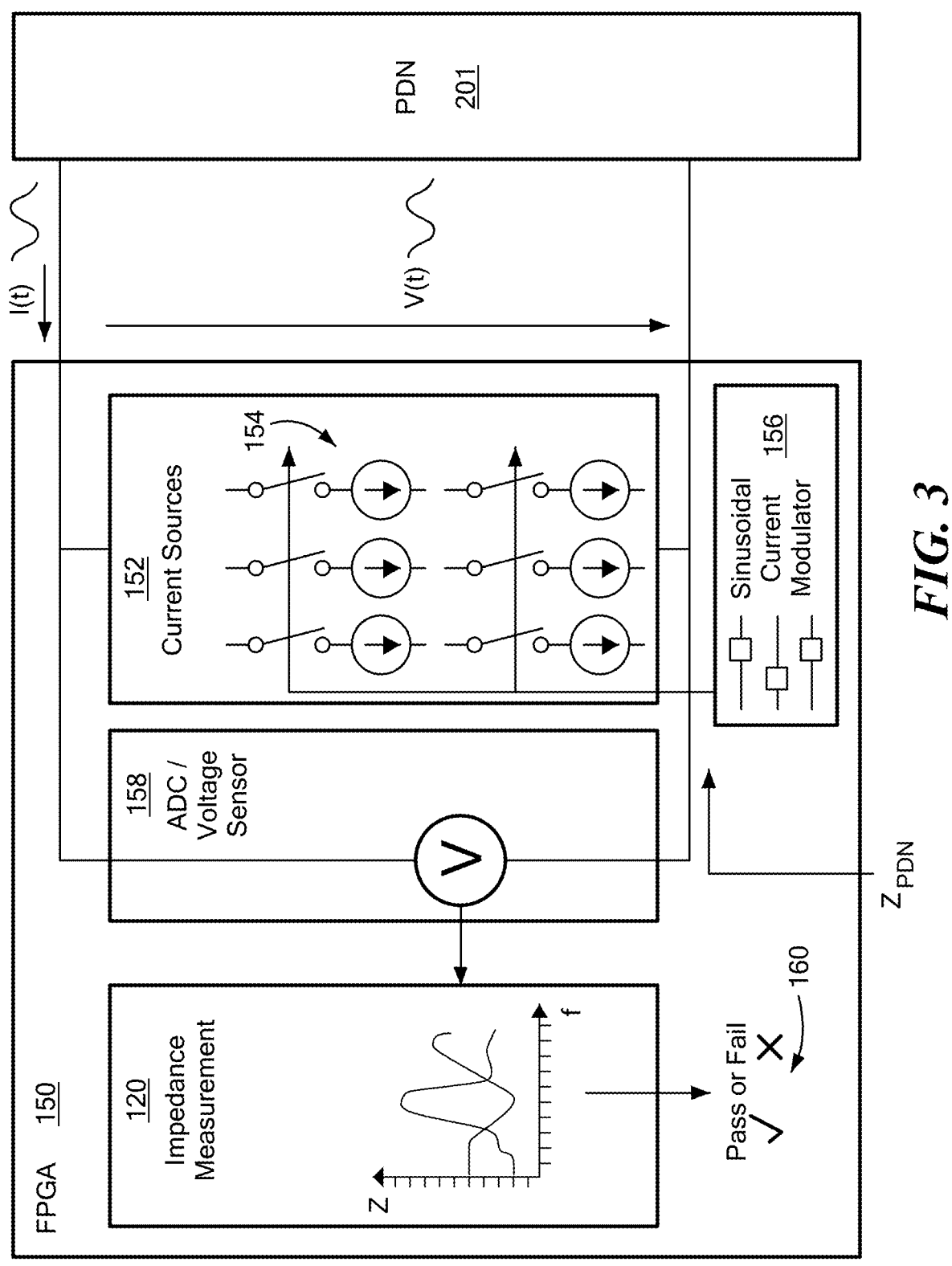
FIG. 3 shows a block diagram of a board mounted FPGA implementation of a Vector Network Analyzer (VNA) according to configurations herein.

The VNA functionality is realized on one or multiple chips of an electronic board to enable self-contained monitoring of the physical integrity from PCB to chip level. A VNA on an FPGA consists of an active and a passive module. FIG. 3 shows a block diagram of a board mounted FPGA implementation of a Vector Network Analyzer (VNA) according to configurations herein. Referring to FIGS. 1-3, the active module 152 needs to stimulate the PDN of the system by drawing high electrical current with different frequencies using so called "power waster" circuits 154 (e.g., an array of interconnected configurable logic blocks (CLBs), ring-oscillators (ROs) or Dual RAM collisions. A sinusoidal current modulator 156 controls the activation frequency of power waster circuits. The passive module 158, on the other hand, needs to measure the caused voltage drops using on-die voltage sensors and other analog-to-digital (ADC) circuits, such as ring-oscillators (ROs) or Time-to-Digital converters (TDCs), using the available resources on FPGAs. Knowing the amount of current consumption and voltage drop can reveal the approximate impedance value of the PDN as seen by the PGA fabric at a specific frequency. A series of computations determines how the impedance is approximated by such circuits.

An FPGA-based VNA employs power wasting circuits based on buffer/inverter chains. A sensing circuit is also employed for measuring the voltage drop, namely one of TDC-based ADCs or RO-based ADCs. The disclosed example employs an RO-based ADC to focus on how the frequency changes in a RO, measured by on-chip binary counters, can be converted to the impedance values. Activating the power wasting circuit on the core voltage plane at frequency $f_i$, generates a sinusoidal current over time through the PDN 201 which causes sinusoidal voltage variation on the PDN with lagging in the phase.

$$I = I_0 e^{j2\pi f_i t} \tag{1}$$

$$V = V_0 e^{j2\pi f_i t + \phi} \tag{2}$$

this case, the impedance of the PDN at frequency $f_i$ in the Polar coordinate representation is given by ohm's law:

$$Z_{PDN} = \frac{V}{I} = \frac{|V|}{|I|} e^{j\phi} \tag{3}$$

8

Using the Cartesian representation, the impedance can be written as a complex number:

$$Z_{PDN} = R_{PDN} + jX_{PDN} \tag{4}$$

where the real part $R_{PDN}$ of impedance is the resistance and the imaginary part $X_{PDN}$ is the reactance caused by capacitance and inductance of the system. While $R_{PDN}$ is independent of the frequency, $X_{PDN}$ is a function of frequency. The magnitude of the PDN impedance can be approximated by considering only the difference in values of voltage and current when the power wasters are active ($V_{ON}$ and $I_{ON}$) or deactivated ($V_{OFF}$ and $I_{OFF}$):

$$|Z_{PDN}| \approx \frac{|\Delta V|}{|\Delta I|} = \frac{|V_{OFF} - V_{ON}|}{|I_{OFF} - I_{ON}|} \tag{5}$$

On FPGAs, $I_{ON}$ and $I_{OFF}$ are constants, and can be estimated either during the synthesis using FPGA power estimators, or using off-chip power monitoring modules. $V_{OFF}$ is equal to the supply voltage of the FPGA $V_{SUPPLY}$. However, the VON is dynamic, and approximated using the frequency of the RO-based sensor during the measurement. The frequency of an RO is proportional to the voltage drop on the FPGA, i.e. $f_{RO_{OFF}} \approx k_{VOFF} = k_{VSUPPLY}$ and $f_{RO_{ON}} \approx kV_{ON}$ where $k$ is a constant. In this case, based on (5), the impedance magnitude at a given frequency can be written as:

$$|Z_{PDN}| \approx \frac{\left(\frac{f_{RO_{OFF}} - f_{RO_{ON}}}{f_{RO_{OFF}}}\right) V_{SUPPLY}}{I_{OFF} - I_{ON}} \tag{6}$$

Where $f_{RO_{OFF}}$ and $f_{RO_{ON}}$ are the RO frequencies, when the power-waster circuits are deactivated and activated, respectively. To characterize the complete profile $|Z_{PDN}|$ over a frequency range, the $f_{RO_{ON}}$ should be measured under different activation frequencies of power-wasting circuits. Note that in the ideal case, the activation signal for the power wasting circuits should be a real sinusoidal wave and not a pulse wave. While sinusoidal waves at a given frequency have a single harmonic, pulse waves at the same frequency contain the sinusoidal frequency and several harmonics at the higher frequencies. This phenomenon is called total harmonic distortion (THD). Hence, to generate such sinusoidal wave signals on FPGAs, one can use either Coordinate Rotation Digital Computer (CORDIC) algorithms or Lookup-Table methods to store amplitude samples of a sinusoidal function over time. Such techniques, unfortunately, cannot generate sinusoidal waves higher than a few tens of megahertz using the fastest clocks on the modern FPGAs. Therefore, at higher frequencies (e.g., higher than 100 MHz), we should inevitably use pulse waves to activate power-wasting circuits. Naturally, this causes inaccuracies in the estimation of the impedance. However, for tampering detection purposes, we are only interested in detecting changes in impedance values and not their absolute physical values. Thus, as long as the measurements for a specific frequency are performed consistently using sinusoidal or pulse waves, we still can rely on the estimated $|Z_{PDN}|$ for tampering detection.

In order to compare the noisy measurements of genuine and tampered systems using the embedded VNA, we should statistically analyze and model the measured impedance values. In the following notation, m is the number of frequency points, where the impedance of the PDN is measured using the embedded VNA. The number of measurement repetitions for frequency $f_i$ is denoted by n. We define $Z_i$ as a random variable corresponding to the impedance of the PDN at the frequency $f_i$. More precisely, we define $$Z_i^G \text{ and } Z_i^T$$

as random variables corresponding to the impedance of the PDN at the frequency $f_i$ in the genuine and tampered systems, respectively.

The realization (i.e. the measured values) of the $$Z_i^G \text{ and } Z_i^T \text{ in the } j^{th}$$

measurement are denoted by $$z_{i_j}^G \text{ and } z_{i_j}^T,$$

respectively. We can then show an empirical Cumulative Distribution Function (eCDF) of $$Z_i^G \text{ and } Z_i^T$$

with $G_i$ and $T_i$ respectively. This leads to the probability density function (PDF) of $$Z_i^G \text{ and } Z_i^T$$

for $\gamma_i$ and $\tau_i$ respectively. Therefore, the comparison for detection of tampering includes comparing the impedance model and the deviant impedance model based on a cumulative distribution function (CDF) of impedance based on respective models of trusted impedance and suspect impedance. The result may be rendered as a pass or fail indication 160.

In order to quantify the difference between of $$Z_i^G \text{ and } Z_i^T,$$

the Wasserstein metric is employed. The Wasserstein metric is a function that gives a distance between probability distributions. The $p^{th}$ ($p \geq 1$) Wasserstein distance between $\gamma_i$ and $\tau_i$ is given by:

$$W_p(\gamma_i, \tau_i) = \left[ \inf \mathbb{E}\left( d\left( \mathcal{Z}_i^G, \mathcal{Z}_i^T \right) \right)^p \right]^{(1/p)} \tag{7}$$

where E(Z) is the expected value of a random variable Z, d is the Euclidean distance between two points, and the infimum is taken over all joint distributions of the random variables of $$Z_i^G \text{ and } Z_i^T$$

with PDFs $\gamma_i$ and $\tau_i$, respectively. If $$Z_i^G \text{ and } Z_i^T$$

are independent variables, then their covariance is 0. Therefore, the $1^{th}$ order Wasserstein distance will be equal to the difference between the means of two distributions.

$$Z_i^G$$

follows a Gaussian distribution with the mean $$\mu_i^G$$

and the deviation $$\sigma_i^G$$

due to the existence of thermal noise, which has the characteristics of a white additive Gaussian process. However $Z_i^T$ does not necessarily follow a Gaussian distribution. In some cases, the tampering can indirectly contribute to unknown disturbances in the measurement of the impedance, which makes $$Z_i^T$$

non-Gaussian. To compare $$Z_i^G$$

and $$Z_i^T,$$

we can use empirical distribution function tests, which can also be applied on non-Gaussian distributions. We deploy two non-parametric statistical tests on samples z1, z2, . . . , zn to detect the tamper events, namely Shapiro-Wilk (SW) and Kolmogorov-Smirnov (KS) tests. The SW test is a test of normality testing whether measurement samples follow a normal distribution. The KS test is a supremum-based statistical testing, which is based on the largest vertical difference between two eCDFs. The KS test can be used to test whether two samples of data result from the same distribution.

Those skilled in the art should readily appreciate that the programs and methods defined herein are deliverable to a user processing and rendering device in many forms, including but not limited to a) information permanently stored on non-writeable storage media such as ROM devices, b) information alterably stored on writeable non-transitory storage media such as solid state drives (SSDs) and media, flash drives, floppy disks, magnetic tapes, CDs, RAM devices, and other magnetic and optical media, or c) information conveyed to a computer through communication media, as in an electronic network such as the Internet or telephone modem lines. The operations and methods may be implemented in a software executable object or as a set of encoded instructions for execution by a processor responsive to the instructions, including virtual machines and hypervisor controlled execution environments. Alternatively, the operations and methods disclosed herein may be embodied in whole or in part using hardware components, such as Application Specific Integrated Circuits (ASICs), Field Programmable Gate Arrays (FPGAs), state machines, controllers or other hardware components or devices, or a combination of hardware, software, and firmware components.

While the system and methods defined herein have been particularly shown and described with references to embodiments thereof, it will be understood by those skilled in the art that various changes in form and details may be made therein without departing from the scope of the invention encompassed by the appended claims.

What is claimed is:

1. In an electronic system on a circuit board having a processor and traces for distribution of power to circuit components on the board, a method of detecting tampering with the electronic system, comprising:

identifying a genuine impedance model of a power distribution network (PDN) electrically coupled to a circuit board by representing an impedance of the PDN as an RLC (Resistance, Inductance, Capacitance) circuit, further comprising:

identifying the genuine impedance model by gathering, by a logic element in electrical communication with voltage outputs of the PDN, samples of genuine impedance profiles from the PDN in a trusted environment; and collecting the samples in an enrollment phase for successive comparison with a deviant impedance model gathered from a suspect environment;

storing the genuine impedance model as an indicator of normal operation of an electronic system on the circuit board;

determining a change to the impedance of the PDN based on a successive gathering of the impedance of the PDN to form the deviant impedance model from the circuit board; and concluding, in the logic element, that a tampering event has occurred to the circuit board based on a comparison of a distance between a probability distribution of genuine impedance values from the genuine impedance model and tampered impedance values from the deviant impedance model.

2. The method of claim 1 further comprising:

generating an expected impedance signature from the genuine impedance model based on a response of the PDN; and determining the tampering event by computing a successive signature and identifying a difference between the successive signature and the expected impedance signature.

3. The method of claim 1 further comprising generating, from the PDN, an equivalent RLC circuit, and identifying the genuine impedance model from the equivalent RLC circuit.

4. The method of claim 3 further comprising identifying the genuine impedance model based on current flow characteristics measured at a range of frequencies exhibited by the PDN.

5. The method of claim 3 further comprising:

deploying a logic element on the circuit board of an electronic system under test, the logic element including instructions for identifying the genuine impedance model, and receiving inputs to the equivalent RLC circuit via electrical communication of the logic element with the PDN.

6. The method of claim 5 wherein the logic element is a Field Programmable Gate Array (FPGA).

7. The method of claim 1 further comprising:

generating the genuine impedance model by stimulating the PDN by drawing electrical current with different frequencies; and measuring voltage drops resulting from the current draw at the different frequencies.

8. The method of claim 1 wherein the logic element computes the distance from, for a plurality of frequencies, a non-zero covariance between a probability density function (PDF) of the genuine impedance model and the deviant impedance model.

9. The method of claim 8 wherein the distance is based on a Wasserstein distance.

10. In an electronic system on a circuit board having a processor and traces for distribution of power to circuit components on the board, a method of detecting tampering with the electronic system, comprising:

identifying a genuine impedance model of a power distribution network (PDN) on a circuit board by representing an impedance of the PDN as an RLC (Resistance, Inductance, Capacitance) circuit;

storing the genuine impedance model as an indicator of normal operation of an electronic system on the circuit board;

determining a change to the impedance of the PDN based on a successive gathering of the impedance of the PDN to form a deviant impedance model from the circuit board; and concluding a tampering event has occurred to the circuit board based on a comparison of the genuine impedance model and the deviant impedance model;

further comprising comparing the genuine impedance model and the deviant impedance model based on a cumulative distribution function (CDF) of impedance based on respective models of trusted impedance and suspect impedance, further comprising a comparison of a distance between a probability distribution of genuine impedance values from the genuine impedance model and tampered impedance values from the deviant impedance model.

11. A PCB board component device on a circuit board implementing an electronic system having a processor and traces for distribution of power to circuit components on the board for detecting tampering with the electronic system, comprising:

an on-board circuit defining a logic element in electrical communication with a power distribution network (PDN) on a circuit board;

a plurality of connections on the circuit board to a power distribution network (PDN) on the circuit board for identifying a genuine impedance model of the PDN by representing an impedance of the PDN as an RLC (Resistance, Inductance, Capacitance) circuit, further comprising gathered genuine samples of impedance profiles from the PDN in a trusted environment, the genuine samples collected in an enrollment phase for successive comparison with a deviant impedance model gathered from a suspect environment;

a memory for storing the genuine impedance model as an indicator of normal operation of an electronic system on the circuit board;

the circuit board configured for determining a change to the impedance model based on a successive gathering of the impedance of the PDN to form the deviant impedance model from the circuit board; and the circuit board configured for concluding a tampering event has occurred to the circuit board based on a comparison of a distance between a probability distribution of genuine impedance values from the genuine impedance model and tampered impedance values from the deviant impedance model.

12. The device of claim 11 further comprising:

an impedance signature generated from the genuine impedance model based on a response of the PDN; and the processor further configured for determining an occurrence of the tampering event by computing a successive signature and identifying a difference between the successive signature and the expected impedance signature.

13. The device of claim 11 further comprising an equivalent RLC circuit generated from the PDN, the genuine impedance model based on the equivalent RLC circuit.

14. A computer program product comprising a non-transitory computer readable storage medium storing program code that, when executed by a processor, performs, in an electronic system on a circuit board having a processor and traces for distribution of power to circuit components on the board, a method of detecting tampering with the electronic system, the method comprising:

forming an on-board circuit defined by a logic element in electrical communication with a power distribution network (PDN) on a circuit board;

identifying a genuine impedance model of a the PDN on the circuit board by evaluating an impedance of the PDN as an RLC (Resistance, Inductance, Capacitance) circuit, further comprising identifying the genuine impedance model by gathering genuine samples of impedance profiles from the PDN in a trusted environment; and collecting the genuine samples in an enrollment phase for successive comparison with a deviant impedance model gathered from a suspect environment;

storing the genuine impedance model as an indicator of normal operation of an electronic system on the circuit board;

determining a change to the impedance of the PDN based on a successive gathering of the impedance of the PDN to form the deviant impedance model from the circuit board; and concluding a tampering event has occurred to the circuit board based on a comparison of a distance between a probability distribution of genuine impedance values from the genuine impedance model and tampered impedance values from the deviant impedance model.

* * * * *